(12) United States Patent
van der Zee (10) Patent No.: US 9,211,680 B2
(45) Date of Patent: Dec. 15, 2015

(54) LOADING APPARATUS AND METHOD OF LOADING ROLLS OF FIBRE BASED SHEET MATERIAL TO AN APPLICATION UNIT

(75) Inventor: Jacobus Johannes van der Zee, Kolding (DK)

(73) Assignee: LM WIND POWER S/A, Kolding (DK)

( * ) Notice: Subject to any disclaimer, the term of this patent is extended or adjusted under 35 U.S.C. 154(b) by 686 days.

(21) Appl. No.: 13/515,071

(22) PCT Filed: Dec. 14, 2010

(86) PCT No.: PCT/EP2010/069631
§ 371 (c)(1),
(2), (4) Date: Aug. 2, 2012

(87) PCT Pub. No.: WO2011/073192
PCT Pub. Date: Jun. 23, 2011

(65) Prior Publication Data
US 2012/0292425 A1 Nov. 22, 2012

(30) Foreign Application Priority Data

Dec. 18, 2009 (EP) .................................. 09179881

(51) Int. Cl.
*B65H 67/00* (2006.01)
*B29C 70/54* (2006.01)
(52) U.S. Cl.
CPC ...................................... *B29C 70/54* (2013.01)
(58) Field of Classification Search
CPC .......................................................... B29C 70/54

USPC ......... 242/557, 558, 559, 559.1, 559.2, 559.4
See application file for complete search history.

(56) References Cited

U.S. PATENT DOCUMENTS

| 1,919,456 | A | * | 7/1933 | Wolf ........................... 242/559.1 |
| 5,156,241 | A | * | 10/1992 | Sugie et al. .................... 242/558 |
| 6,209,819 | B1 | * | 4/2001 | Habisreitinger et al. .. 242/559.3 |
| 6,328,249 | B1 | * | 12/2001 | Ogawa et al. ............... 242/559.2 |
| 8,011,871 | B2 | * | 9/2011 | Lehrieder et al. ............. 414/279 |
| 2004/0200922 | A1 | * | 10/2004 | Nakamura et al. .......... 242/596.5 |
| 2007/0108336 | A1 | * | 5/2007 | Benvenuti et al. .......... 242/533.8 |
| 2010/0154355 | A1 | * | 6/2010 | Freudenberg et al. ....... 53/389.1 |
| 2010/0237181 | A1 | * | 9/2010 | Andersson et al. ........ 242/559.2 |

FOREIGN PATENT DOCUMENTS

| EP | 0578903 A1 | 1/1994 |
| EP | 2128058 A1 | 12/2009 |

* cited by examiner

*Primary Examiner* — William A Rivera
(74) *Attorney, Agent, or Firm* — Nath, Goldberg & Meyer; Jerald L. Meyer; Tanya E. Harkins (57) ABSTRACT

The loading apparatus (1) for loading rolls (2) of fiber based sheet material to an application unit for the production of fiber-reinforced parts comprises a frame (4) on which a lift (5) is arranged displaceably in vertical direction and is adapted to carry at least one roll (2). The lift (5) comprises a swivel mechanism (6) arranged rotatably about a swivel axis (7) and comprising at least first grippers (18) adapted to releasably grip shaft ends (9) of a first roll (2a) and second grippers (19) adapted to releasably grip shaft ends (10) of a second roll (2b). A method of loading rolls is also disclosed.

16 Claims, 7 Drawing Sheets

LOADING APPARATUS AND METHOD OF LOADING ROLLS OF FIBRE BASED SHEET MATERIAL TO AN APPLICATION UNIT

This is a National Phase Application filed under 35 U.S.C. 371 as a national stage of PCT/EP2010/069631, filed Dec. 14, 2010, and claiming the benefit from European Application No. 09179881.9, filed Dec. 18, 2009, the content of which is hereby incorporated by reference in its entirety.

The present invention relates to a loading apparatus for loading rolls of fibre based sheet material to an application unit for the production of fibre-reinforced parts, such as blades for wind power plants, the loading apparatus comprising a frame on which a lift is arranged displaceably in vertical direction and is adapted to carry at least one roll of fibre based sheet material.

In the production of blades for wind power plants, typically, an application unit having the form of a bridge is employed to roll out and position fibre based sheet material in an open mould, whereby, during application of the sheet material, the application unit runs on a track comprising rails placed at either side of the open mould. In this way, a roll of sheet material placed on the bridge may be moved above and along the open mould. When a roll of sheet material runs out or has to be replaced by another roll for other reasons, for instance because another width of sheet material is required, the application unit is run to an end of the track, and the used roll is removed and lowered to the ground by means of a fork lift or jib crane. Subsequently, a new roll of sheet material is lifted up and positioned on the application unit by means of said fork lift or jib crane. Consequently, the fork lift or jib crane has to be run up and down twice in order to replace a roll with another one. This procedure may, for instance, typically take 4 to 8 minutes for each roll exchange. If, for instance, the production of one single blade may require about 17 to 20 different types of rolls, quite a lot of time may be used on the exchange of rolls.

The object of the present invention is to provide a loading apparatus enabling a faster exchange of rolls.

In view of this object, the lift comprises a swivel mechanism arranged rotatably about a swivel axis and comprising at least first grippers adapted to releasably grip shaft ends of a first roll and second grippers adapted to releasably grip shaft ends of a second roll.

In this way, the exchange of rolls may be performed very fast, as the swivel mechanism may be loaded with a new roll and lifted up to adequate height already before the application unit has reached the end of the track, and, subsequently, the swivel mechanism may grip the used roll, rotate about its swivel axis and place the new roll on the application unit. Immediately thereafter, the application unit may run down its track laying out sheet material. In the meantime, the swivel mechanism may be lowered and the used roll may be replaced by a new one, so that the swivel mechanism is ready for the next exchange of rolls.

In an embodiment, the swivel mechanism is arranged displaceably on the lift in a horizontal direction at right angles to the swivel axis. Thereby, the flexibility of the loading apparatus may be improved, so that, for instance, a roll may be conveyed in horizontal direction in order to reach a mounting position for rolls located above a walkway of the application unit.

In an embodiment, the first grippers and the second grippers, respectively, may be swung between an extended position, in which the grippers are extended horizontally in relation to the frame, and a retracted position, in which the grippers are retracted horizontally in relation to the frame, the grippers are provided with radially opening bearings for the shaft ends of the rolls, and said bearings are upward open in the extended position of the grippers. Thereby, a roll may quickly be removed from a mounting position of the application unit, because the upward open bearings may simply lift the roll upwards immediately without having to wait for a closure mechanism to close the radial opening of the bearings. Similarly, a roll may quickly be placed in a mounting position.

In an embodiment, the radially opening bearings for the shaft ends of the rolls are provided with a closure mechanism adapted to automatically close the radial opening of the bearings. Thereby, a roll may be locked in the radially opening bearings during rotation of the swivel mechanism, so that the roll does not fall down when the opening of the bearings is directed downward.

In structurally advantageous embodiment, the swivel mechanism is composed by two parallel, spaced swivel arms, and each swivel arm comprises a first gripper at a first end and a second gripper at a second end.

In an embodiment, the loading apparatus comprises at least one movable cartridge adapted to carry a number of rolls. Thereby, a number of rolls may be pre-loaded on the cartridge for quick access by the loading apparatus.

In an embodiment, the loading apparatus is displaceable in the direction of the swivel axis. Thereby, different mounting positions of rolls on the application unit may be served by the loading apparatus. Furthermore, different application units may be served by the loading apparatus.

The present invention further relates to a plant for the production of fibre-reinforced parts comprising a loading apparatus as described above and an application unit. The application unit is provided with a number of different mounting positions for rolls, said mounting positions being distributed in the axial direction of the rolls, and a sensor is provided at each of said mounting positions in order to detect the actual position of the loading apparatus. Thereby, it may be ensured that the loading apparatus is at the correct position before exchange of a roll is performed.

In an embodiment, the application unit is provided with a fence comprising separate gates corresponding to the different mounting positions for rolls, respectively. Thereby, safety of an operator working on the application unit may be improved.

In an embodiment, the application unit is provided with a first and a second push button so adapted that both buttons are required to be in an activated state simultaneously in order for the exchange of a roll on the application unit to be performed by means of the loading apparatus. Thereby, safety of an operator working on the application unit may be even further improved.

In an embodiment, the application unit is provided with an input device so adapted that an operator may chose a mounting position for a roll to be exchanged by means of the loading apparatus.

The present invention further relates to a plant for the production of fibre-reinforced parts comprising a single loading apparatus as described above and a first and a second application unit. Said single loading apparatus is arranged to serve the first and the second application units, the first and the second application units are arranged running on a first and a second track, respectively, said first and second tracks being parallel, and said single loading apparatus is arranged displaceable in a direction at right angles to the first and second tracks. Thereby, the single loading apparatus may serve the first application unit when the second unit is working, and it may serve the second unit when the first is working.

In an embodiment, said single loading apparatus is arranged to further serve a third and a fourth application unit arranged running on a third and a fourth track, respectively, the third track being arranged in extension of the second track, and the fourth track being arranged in extension of the first track, and said single loading apparatus is arranged rotatably about a vertical axis. Thereby, the single loading apparatus may serve four application units.

The present invention further relates to a method of loading rolls of fibre based sheet material to an application unit for the production of fibre-reinforced parts, such as blades for wind power plants, whereby a first roll already present on the application unit is removed from the application unit and lowered vertically, and a second roll is lifted vertically and supplied to the application unit.

The method is characterized by that it comprises the following steps in succession:
a) the second roll is gripped by means of second grippers arranged on a swivel mechanism,
b) the second roll is lifted,
c) the first roll already present on the application unit is gripped by means of first grippers arranged on the swivel mechanism,
d) the swivel mechanism is swung about a swivel axis so that the first roll is replaced by the second roll,
e) the first roll is lowered.

Thereby, the above-mentioned properties may be obtained.

In an embodiment, the swivel mechanism is displaced in horizontal direction in order for the first grippers to reach the first roll already present on the application unit. Thereby, the above-mentioned properties may be obtained.

In an embodiment, the swivel mechanism is rotated back and forth and is displaced in horizontal direction back and forth in order for the second grippers to place the second roll on the application unit. Thereby, placement of the second roll on the application unit may be facilitated and the entire roll-exchange procedure may be speeded up.

In an embodiment, arranged on the grippers, closure mechanisms of radially opening bearings for the shaft ends of the rolls are adapted to automatically close and open the radial opening of the bearings during horizontal displacement of the swivel mechanism. Thereby, a roll may quickly be removed from a mounting position of the application unit, because the upward open bearings may simply lift the roll upwards immediately without having to wait for a closure mechanism to close the radial opening of the bearings. Similarly, a roll may quickly be placed in a mounting position.

In an embodiment, radially opening bearings for the shaft ends of the rolls provided on the first and second grippers, respectively, are upward open when removing a roll from the application unit or supplying a roll to the application unit. Thereby, the above-mentioned properties may be obtained.

In an embodiment, a single loading apparatus comprising the swivel mechanism is loading rolls to several application units in succession, whereby the loading apparatus is displaced between the different application units and possibly rotated about a vertical axis. Thereby, the above-mentioned properties may be obtained.

The invention will now be explained in more detail below by means of examples of embodiments with reference to the very schematic drawing, in which.

Figure 1:
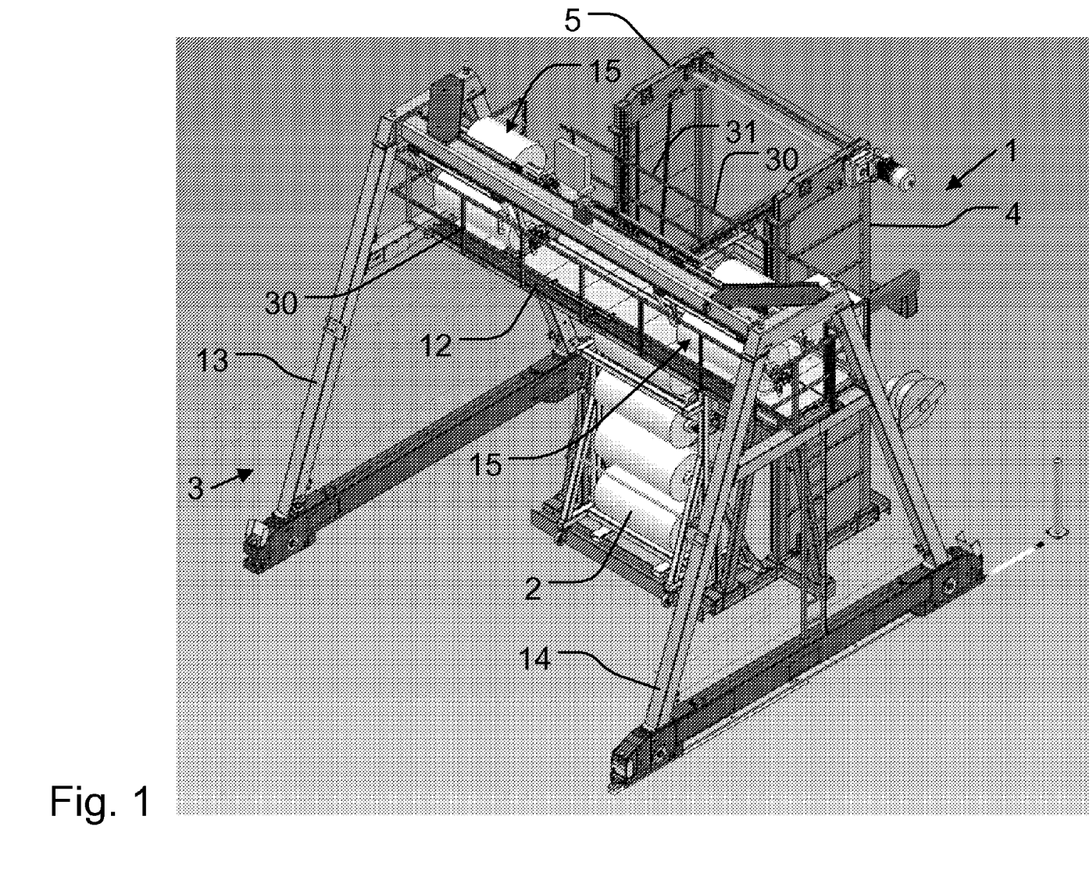
FIG. 1 is a perspective view of a loading apparatus with a cartridge and an application unit for the production of fibre-reinforced parts.

FIG. 1 shows a loading apparatus 1 for loading rolls 2 of fibre based sheet material to an application unit 3 for the production of not shown fibre-reinforced parts, such as blades for wind power plants. The loading apparatus 1 comprises a frame 4 on which a lift 5 is arranged displaceably in vertical direction. On the lift 5, a swivel mechanism 6 is arranged rotatably about a horizontal swivel axis 7 and comprises first grippers 18 adapted to releasably grip shaft ends 9 of a first roll 2a and second grippers 19 adapted to releasably grip shaft ends 10 of a second roll 2b. It is noted that in FIGS. 2 and 3, the first and second rolls 2a, 2b are illustrated by means of empty rolls so that only shafts 11 of the rolls are shown. The shafts 11 may be so-called air shafts that are adapted to expand by means of air pressure, thereby fixing a not shown inner tube of the roll to the shaft. However, any kind of shaft may be employed according to the invention.

Referring to FIG. 1, the application unit 3 has the form of a wagon being composed by a walkway 12 being carried at either end, respectively, by a first leg 13 and a second leg 14. During application of sheet material on a not shown open mould, the application unit 3 runs with its first leg 13 on a first rail and with its second leg 14 on a second rail, so that the walkway 12 extends in a direction at right angles to the first and second rails. The first and second rails form a not shown track for the application unit and are placed at either side of the open mould.

An operator may work on the walkway 12 that is provided with a number of different mounting positions 15 for rolls 2, said mounting positions being distributed in the axial direction of the rolls. In this way, fibre based sheet material may be unrolled from an appropriate roll during displacement of the application unit 3 along the track, whereby the sheet material may be laid out on the open mould. A not shown sensor is provided at each of said mounting positions in order to detect the actual position of the loading apparatus 1 when a roll 2 on the application unit 3 is to be exchanged by the loading apparatus 1. The application unit 3 is provided with a fence 30 comprising separate gates 31 corresponding to the different mounting positions for rolls 2, respectively. Each gate 31 may be provided with a separate automatic locking mechanism preventing the gate 31 from opening, if the loading apparatus 1 is not detected at the corresponding position.

Furthermore, the application unit 3 is provided with not shown first and second push buttons so adapted that both buttons are required to be in an activated state simultaneously in order for the exchange of a roll 2 on the application unit 3 to be performed by means of the loading apparatus 1. Said first and second push buttons may also be required to be pressed in order for the above mentioned separate automatic locking mechanism of the gate 31 to open. The application unit is further provided with a not shown input device so adapted that an operator may chose a mounting position 15 for a roll 2 to be exchanged by means of the loading apparatus 1.

Figure 2:
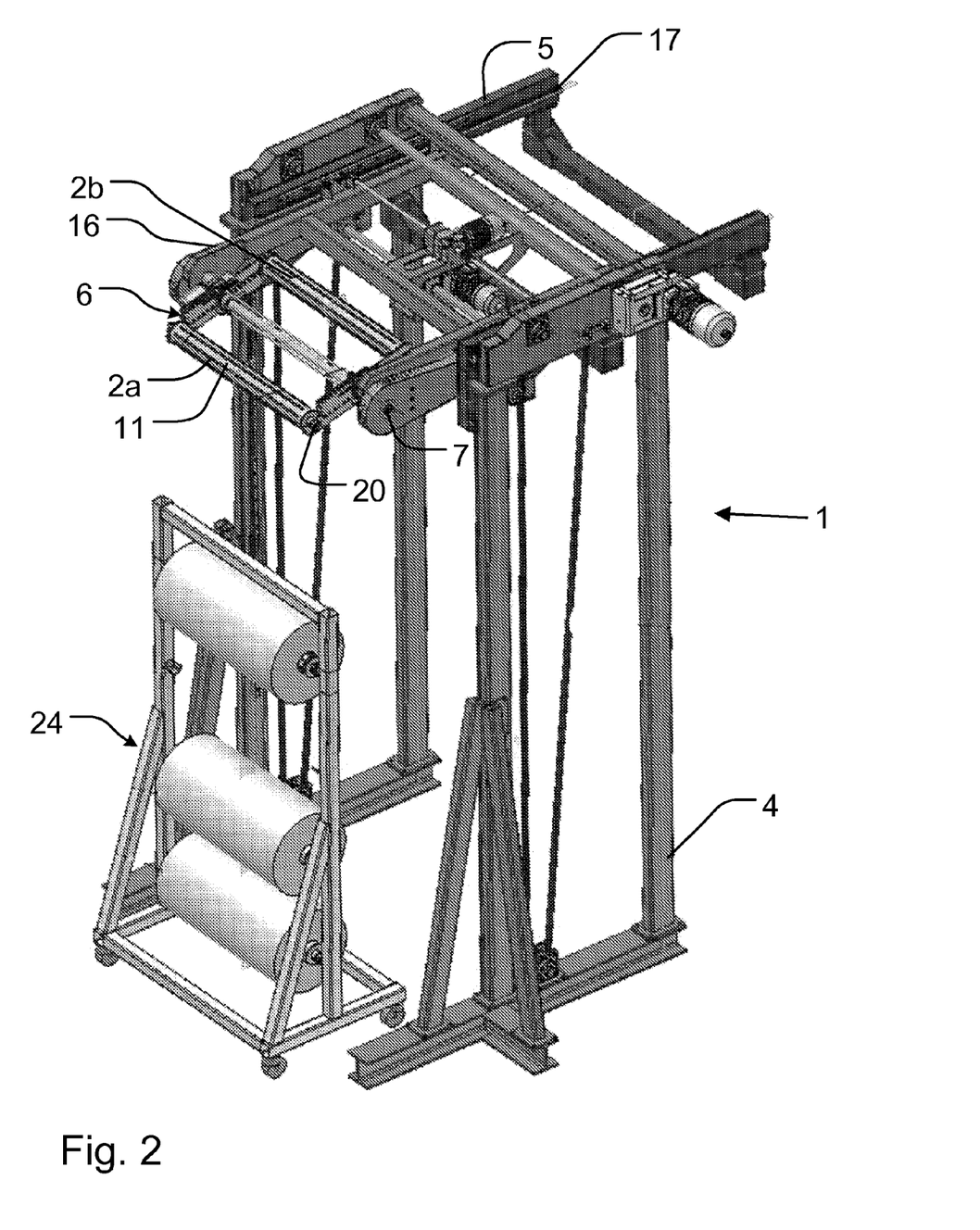
FIG. 2 is a perspective view of the loading apparatus with cartridge in FIG. 1.

As it is best shown in FIG. 2, the swivel mechanism 6 is arranged displaceably on the lift 5 in a horizontal direction at right angles to the swivel axis 7. The swivel mechanism 6 is carried rotatably about is swivel axis 7 on a slide 16 that is slidably arranged in a horizontal track 17 of the lift 5. In this way, the swivel mechanism 6 may reach a further extended position above the walkway 12 in order to exchange rolls placed above the walkway. Alternatively to arranging the swivel mechanism 6 displaceably on the lift 5 in a horizontal direction, the loading apparatus 1 itself or at least the frame 4 thereof may be arranged displaceably in said direction.

The first grippers 18 and the second grippers 19, respectively, may be swung between an extended position, in which the grippers 18, 19 are extended horizontally in relation to the frame 4, and a retracted position, in which the grippers are retracted horizontally in relation to the frame 4. In FIG. 2, the first roll 2a is illustrated almost in the extended position, and the second roll 2b is illustrated almost in the retracted position. The grippers 18, 19 are provided with radially opening bearings 20, 21 for the shaft ends 9, 10 of the rolls 2. By radially opening bearings 20, 21 is meant that the bearings 20, 21 are open in a radial direction of the shaft 11 when its shaft ends 9, 10 are located in the bearings. Furthermore, in the embodiment shown in the figures, the radially opening bearings 20, 21 are open in a peripheral direction in relation to the swivel axis 7.

Figure 3:
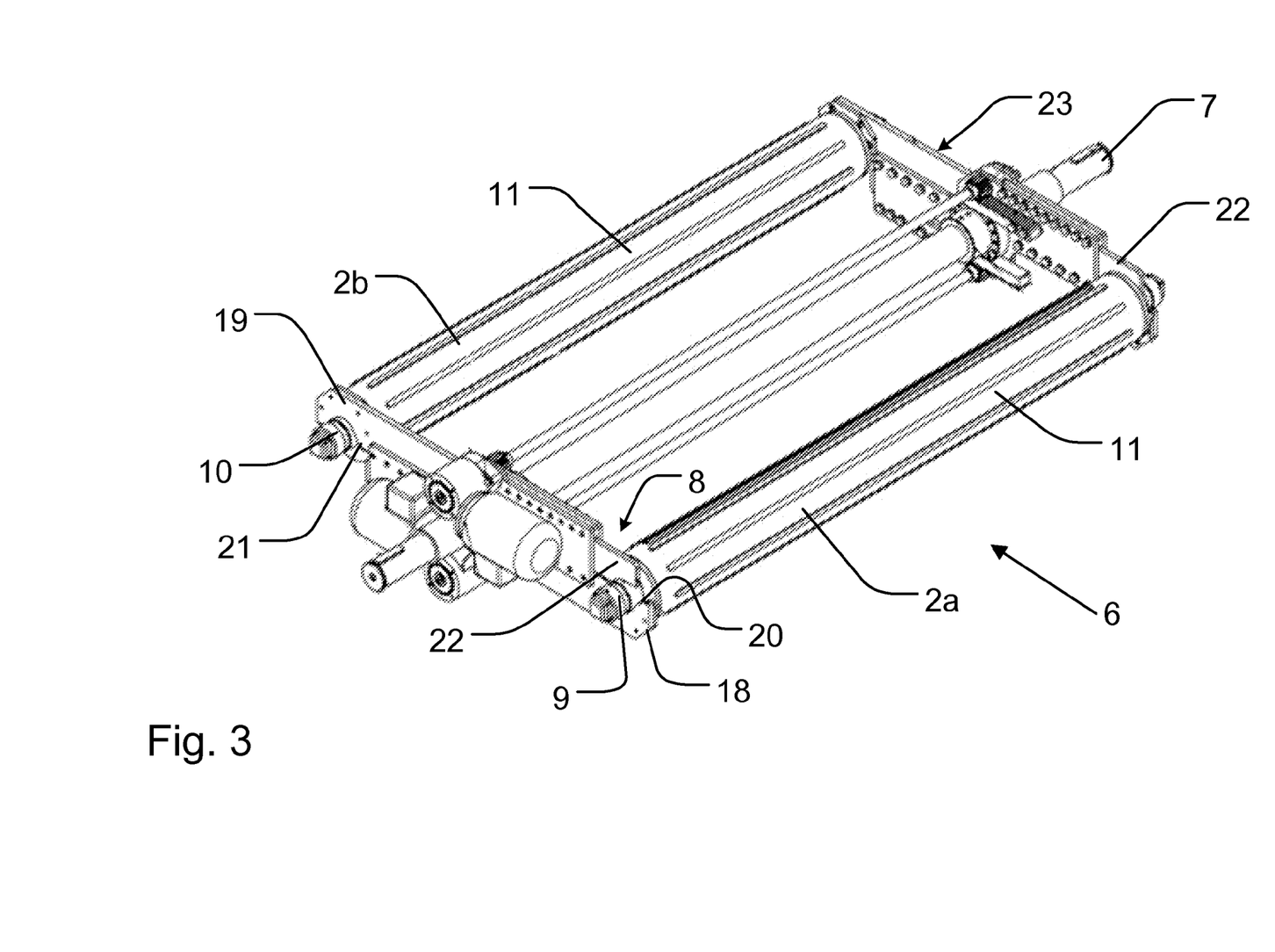
FIG. 3 is a perspective view of a swivel mechanism of the loading apparatus in FIG. 2.

As illustrated in FIG. 2, whereby the first roll 2a is in the extended position, and the corresponding bearing 20 is upward open, said bearings 20, 21 are upward open in the extended position of the grippers 18, 19; see also FIG. 3. Further referring to FIG. 3, the radially opening bearings 20, 21 for the shaft ends 9, 10 of the rolls 2 are provided with a closure mechanism 8 adapted to automatically close the radial opening of the bearings. The closure mechanism 8 has the form of a latch 22 displaceable between an extended position, in which the bearing is closed by the latch 22 so that a shaft end 9 located in the bearing 20 is retained in the bearing, see the bearings 20 of the first grippers 18 in FIG. 3, and a retracted position, in which the bearing is open so that a shaft end 10 may be taken out from the bearing, see the bearings 21 of the second grippers 19 in FIG. 3. The latches 22 are operated by means of an electric motor. Any other suitable closure mechanism may be employed alternatively to the one shown in the figures.

In the embodiment shown in the figures, in order to exchange a roll on the application unit 3, the swivel mechanism 6 is advantageously operated so that it rotates clockwise when viewed in the inclined direction of the swivel axis 7 from the right to the left in FIG. 2. In this way, the upward open bearing 20 may quickly, coming from below, lift the roll 2a up from its mounting position on the application unit 3 and start to move the roll away even before the closure mechanisms 8 have had time to close the radial opening of the bearings. Similarly, when the swivel mechanism has rotated and is about to place another roll 2b on the application unit, the closure mechanisms 8 may start to open the radial opening of the bearings before the mounting position on the application unit 3 is reached. As the bearings are upward open, the shaft ends may not fall out of the bearings. Before placement of the other roll 2b on the application unit, the swivel mechanism 6 may be displaced slightly in horizontal direction in order for the roll with its shaft ends to be lifted to a level slightly above the bearings of the application unit 3. Lifted to this position, the swivel mechanism 6 may be displaced slightly backwards in horizontal direction in order for shaft ends to be located just above the bearings of the application unit 3. Then, the swivel mechanism 6 may be rotated slightly counter clockwise until the shaft ends are located correctly in the bearings of the application unit and the shaft ends are out of the bearings of the swivel mechanism.

At the mounting positions on the application unit 3, the shaft ends 9, 10 of the rolls may be carried by permanently upward open bearings in order for the rolls to be easy removable by the swivel mechanism 6. Of course, locking mechanisms may be provided in order to secure the rolls in place on the application unit 3 during the laying out of sheet material.

In the embodiment shown in the figures, the swivel mechanism 6 is composed by two parallel, spaced swivel arms 23, each comprising a first gripper 18 at a first end and a second gripper 19 at a second end. However, the grippers may also be arranged alternatively, for instance at the perimeter of a pair of wheels or of a drum forming the swivel mechanism.

Figure 4:
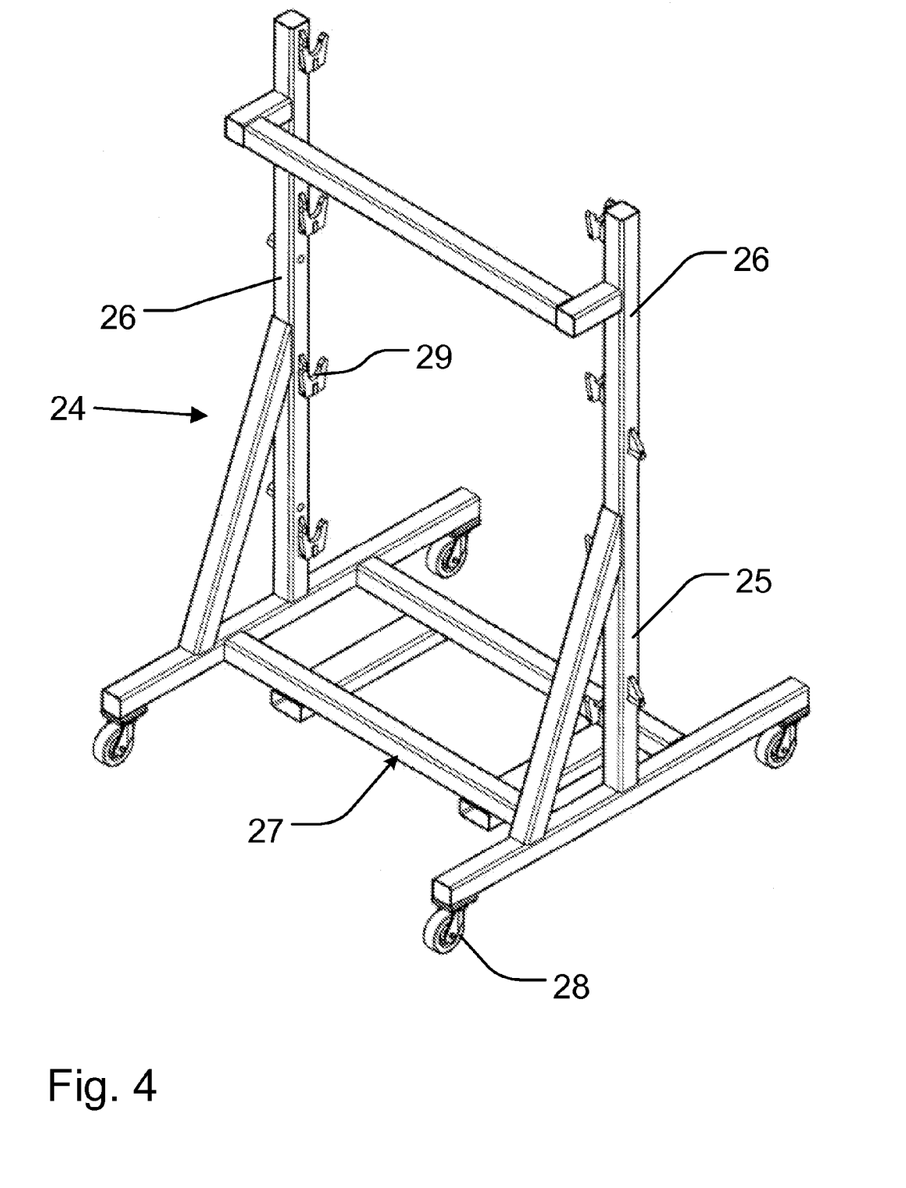
FIG. 4 is a perspective view of the cartridge of the loading apparatus in FIG. 2.

As illustrated in FIG. 2, the loading apparatus 1 comprises a movable cartridge 24 adapted to carry a number of rolls 2. The movable cartridge 24 is separately illustrated in FIG. 4 and has a cartridge frame 25 comprising two spaced vertical bars 26 carried by a basis frame 27 provided with castor wheels 28. The two spaced vertical bars 26 are provided with upward open bearings 29 adapted to support shaft ends 9, 10 of rolls 2. The movable cartridge 24 may be moved manually by pushing it or it may be manipulated for instance by a fork lift. A stock of pre-loaded cartridges may be prepared with appropriate types of rolls 2 according to a schedule for the production of the fibre-reinforced parts.

In order to reach the different mounting positions 15 for rolls 2 of the walkway 12 of the application unit 3, the loading apparatus 1 is displaceable, preferably on not shown tracks, in the direction of the swivel axis 7. Of course, alternatively or additionally, the swivel mechanism 6 may be arranged displaceably in the direction of its swivel axis 7 relatively to the frame 4.

Figure 5:
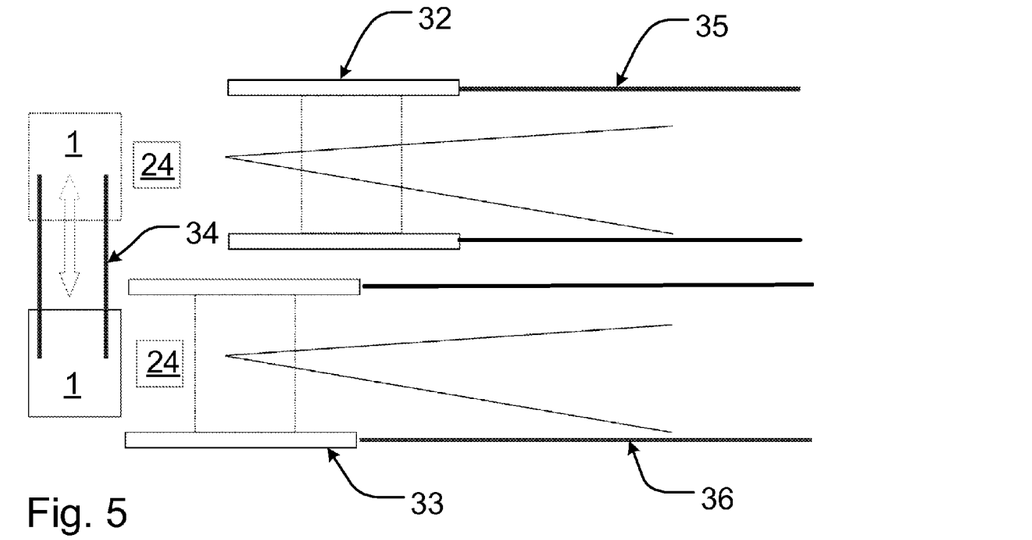
FIG. 5 is a very schematic top view of a single loading apparatus serving two application units.

Further, in an embodiment illustrated in FIG. 5, in order for one single loading apparatus 1 to be arranged to serve a first and a second application unit 32, 33 running on first and second parallel tracks 35, 36, respectively, said single loading apparatus 1 is arranged displaceable on a track 34 in a direction at right angles to the first and second tracks 35, 36. In order to illustrate the movement on the track 34, the single loading apparatus 1 is shown at two different positions at either end of the tracks.

Figure 6:
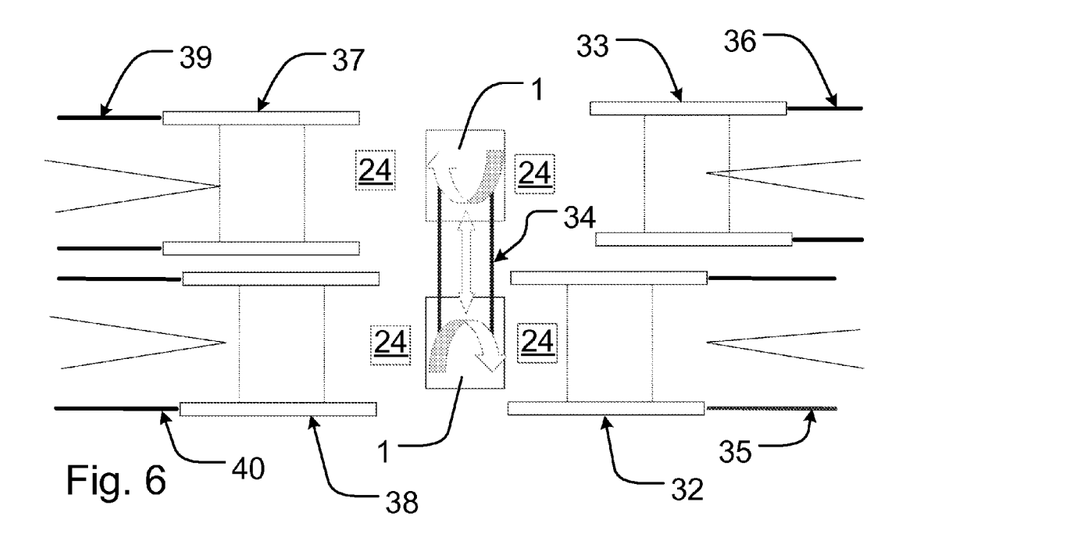
FIG. 6 is a very schematic top view of a single loading apparatus serving four application units.

In the embodiment illustrated in FIG. 6, which is a further development of the embodiment illustrated in FIG. 5, in order for the single loading apparatus 1 to be arranged to further serve a third and a fourth application unit 37, 38 arranged running on a third and a fourth track 39, 40, respectively, the third track 39 being arranged in extension of the second track 36, and the fourth track 40 being arranged in extension of the first track 35, said single loading apparatus 1 is arranged rotatably about a vertical axis as illustrated by the bent arrows. In order to illustrate the movement on the track 34, the single loading apparatus 1 is shown at two different positions at either end of the tracks.

Figure 7:
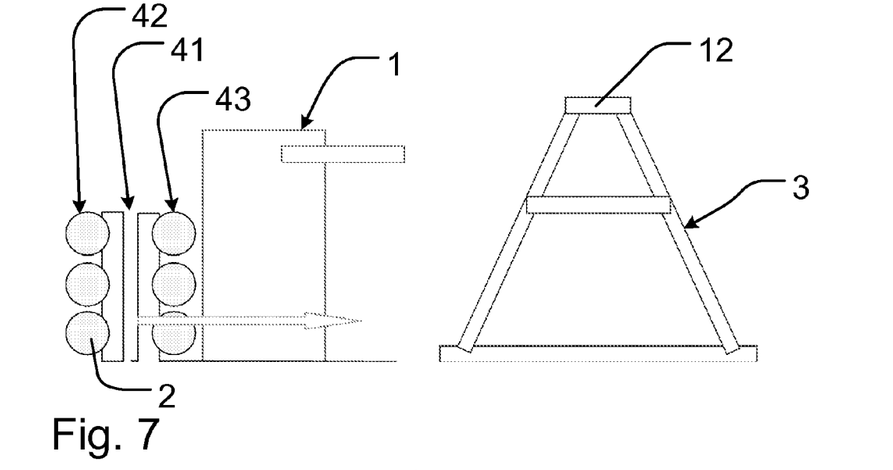
FIG. 7 is a very schematic side view of another embodiment of a cartridge arranged together with a loading apparatus and an application unit.
Figure 8:
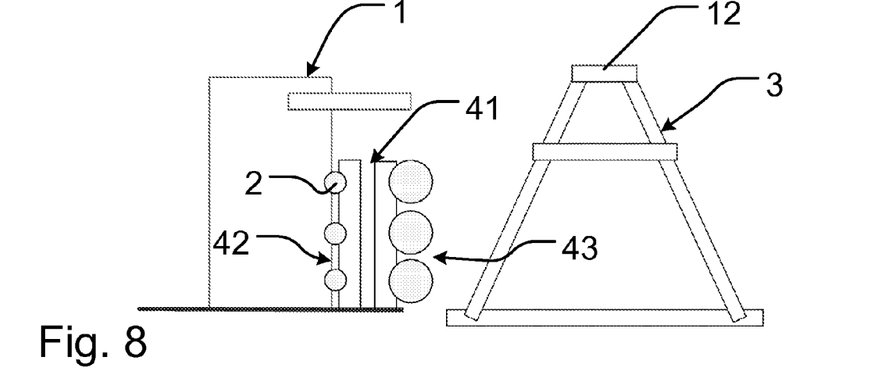
FIG. 8 is a side view corresponding to that of FIG. 7, whereby the cartridge has been moved and material on some of the rolls has been used.
Figure 9:
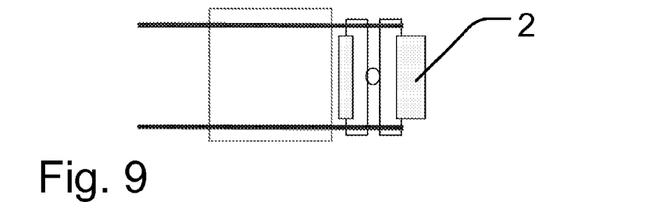
FIG. 9 is a top view of the cartridge and loading apparatus of FIG. 8.
Figure 10:
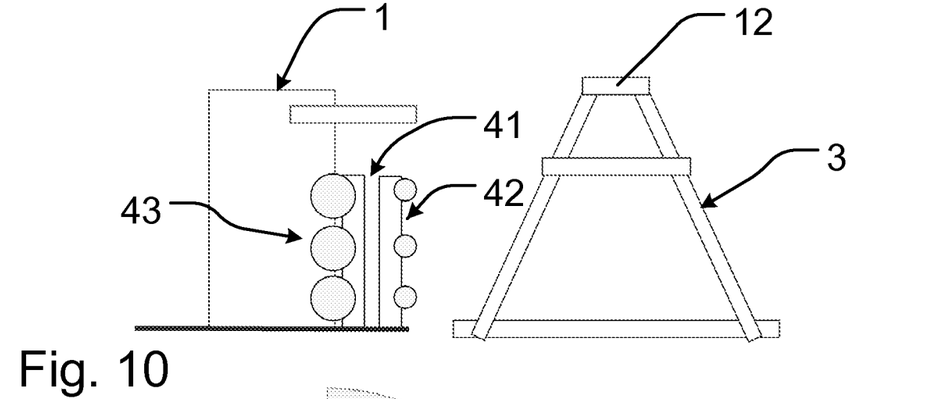
FIG. 10 is a side view corresponding to that of FIG. 8, whereby the cartridge has been turned 180 degrees.
Figure 11:
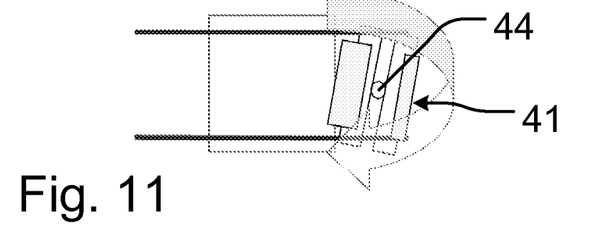
FIG. 11 is a top view of the cartridge and loading apparatus of FIG. 10 illustrating the turning of the cartridge.

FIGS. 7 to 11 illustrate how a cartridge 41 having two vertical rows 42, 43 of rolls may be employed. In FIG. 7, the cartridge is placed to the left of the loading apparatus 1, and in FIGS. 8 and 9, the cartridge 41 has been rolled on its castor wheels under the walkway 12 of the application unit 3 to a position to the right of the loading apparatus 1 and to the left of the application unit 3. Further, in FIGS. 8 and 9, the rolls 2 of the left vertical row 42 of rolls have been at least partially emptied. In FIG. 10, the cartridge 41 has been rotated about a vertical axis 44, so that the at least partially emptied rolls are positioned to the right. Thereby, the unused rolls are positioned to the left and therefore accessible by the loading apparatus 1.

According to the method according to the invention of loading rolls 2 of fibre based sheet material to an application unit 1 for the production of fibre-reinforced parts, such as blades for wind power plants, the following steps are performed in succession:

a) the second roll 2b is gripped by means of the second grippers 19 arranged on a swivel mechanism 6,
b) the second roll 2b is lifted,
c) the first roll 2a already present on the application unit 1 is gripped by means of the first grippers 18 arranged on the swivel mechanism 6,
d) the swivel mechanism 6 is swung about the swivel axis 7 so that the first roll 2a is replaced by the second roll 2b,
e) the first roll 2a is lowered.

According to an embodiment of the method according to the invention, the following more detailed steps are suggested to be performed more or less in the order listed below:

1) the shaft ends 10 of the second roll 2b located on the cartridge 24 is gripped by means of the second grippers 19 arranged on a swivel mechanism 6,
2) the second roll 2b is lifted by rotation of the swivel mechanism 6 in clockwise direction and/or upward movement of the lift 5,
3) the closure mechanism 8 of the second grippers 19 is activated to lock the shaft ends 10 of the second roll 2b,
4) the second roll 2b is shifted to the retracted position by rotation of the swivel mechanism 6,
5) the lift 5 is moved upward and the swivel mechanism 6 is moved horizontally so that the first grippers 18 of the swivel mechanism 6 are placed just under the bearings of the application unit at the mounting position where the first roll 2a is already present,
6) the first roll 2a on the application unit 1 is gripped by means of the first grippers 18 arranged on the swivel mechanism 6 by rotation of the swivel mechanism 6 in clockwise direction and/or upward movement of the lift 5,
7) the closure mechanism 8 of the first grippers 18 is activated to lock the shaft ends 9 of the first roll 2a,
8) the first roll 2a is lifted by rotation of the swivel mechanism 6 in clockwise direction and/or upward movement of the lift 5,
9) the swivel mechanism 6 is displaced slightly in horizontal direction away from the application unit 3 and is swung about the swivel axis 7 in clockwise direction so that the first roll 2a is replaced by the second roll 2b,
10) the swivel mechanism 6 is displaced slightly in horizontal direction against the application unit 3 so that the shaft ends 10 of the second roll 2b are located just above the bearings of the application unit at the mounting position where the first roll 2a was removed,
11) the closure mechanism 8 of the second grippers 19 is activated to unlock the shaft ends 10 of the second roll 2b,
12) the second roll 2b is lowered by rotation of the swivel mechanism 6 in counter clockwise direction and/or downward movement of the lift 5 so that the shaft ends 10 of the second roll 2b are located in the bearings of the application unit,
13) the swivel mechanism 6 is displaced slightly in horizontal direction away from the application unit 3,
14) the first roll 2a is lowered by downward movement of the lift 5,
15) the swivel mechanism 6 is displaced slightly in horizontal direction toward the cartridge 24,
16) the shaft ends 9 of the first roll 2a are located in bearings of the cartridge 24 by rotation of the swivel mechanism 6 in counter clockwise direction and/or downward movement of the lift 5,
17) the closure mechanism 8 of the first grippers 18 is activated to unlock the shaft ends 9 of the first roll 2a,
18) the swivel mechanism 6 is rotated further in counter clockwise direction and/or the lift 5 is moved downward.

The skilled person will understand that the order of the steps and/or the exact way of performing the steps may be varied within the scope of the invention. It will also be understood that some of these steps may be left out and other steps may be employed.

It is noted that all moving mechanical parts of the loading apparatus as well as of the application unit may be motorized, for instance by means of electrical motors or similar suitable devices, and that the movements of these mechanical parts may be controlled by one or more computers or the like.

The invention claimed is:

1. A loading apparatus (1) for loading rolls (2) of fibre based sheet material to an application unit (3) for the production of fibre-reinforced parts, for blades for wind power plants, the loading apparatus (1) comprising
a frame (4) on which a lift (5) is arranged displaceably in vertical direction and is adapted to carry at least one roll (2) of fibre based sheet material,
wherein the lift (5) comprises a swivel mechanism (6) arranged rotatably about a swivel axis (7) and having at least first grippers (18) adapted to releasably grip shaft ends (9) of a first roll (2a) and second grippers (19) adapted to releasably grip shaft ends (10) of a second roll (2b); and
wherein the swivel mechanism (6) is arranged displaceably on the lift (5) in a horizontal direction at right angles to the swivel axis (7).

2. A loading apparatus according to claim 1, characterized in that the swivel axis (7) is horizontal, in that the first grippers (18) and the second grippers (19), respectively, may be swung between an extended position, in which the grippers (18, 19) are extended horizontally in relation to the frame (4), and a retracted position, in which the grippers (18, 19) are retracted horizontally in relation to the frame (4), in that the grippers (18, 19) are provided with radially opening bearings (20, 21) for the shaft ends (9, 10) of the rolls (2a, 2b), and in that said bearings (20, 21) are upward open in the extended position of the grippers (18, 19).

3. A loading apparatus according to claim 2, characterized in that the radially opening bearings (20, 21) for the shaft ends (9, 10) of the rolls (2a, 2b) are provided with a closure mechanism (8) adapted to automatically close the radial opening of the bearings (20, 21).

4. A loading apparatus according to claim 1, characterized in that the swivel mechanism (6) is composed by two parallel, spaced swivel arms (23), and in that each swivel arm comprises a first gripper (18) at a first end and a second gripper (19) at a second end.

5. A loading apparatus according to claim 1, characterized in that the loading apparatus (1) comprises at least one movable cartridge (24, 41) adapted to carry a number of rolls (2).

6. A loading apparatus according to claim 1, characterized in that the loading apparatus (1) is displaceable in the direction of the swivel axis (7).

7. A plant for the production of fibre-reinforced parts comprising a loading apparatus (1) according to claim 1 and an application unit (3), characterized in that the application unit (3) is provided with a number of different mounting positions (15) for rolls, said mounting positions being distributed in the axial direction of the rolls (2), and in that a sensor is provided at each of said mounting positions (15) in order to detect the actual position of the loading apparatus (1).

8. A plant for the production of fibre-reinforced parts according to claim 7, characterized in that the application unit (3) is provided with a fence (30) comprising separate gates (31) corresponding to the different mounting positions (15) for rolls (2), respectively.

9. A plant for the production of fibre-reinforced parts according to claim 7, characterized in that the application unit is provided with an input device so adapted that an operator may chose a mounting position (15) for a roll (2) to be exchanged by means of the loading apparatus (1).

10. A plant for the production of fibre-reinforced parts comprising a single loading apparatus (1) according to claim 1 and a first and a second application unit (32, 33), characterized in that said single loading apparatus (1) is arranged to serve the first and the second application units (32, 33), in that the first and the second application units (32, 33) are arranged running on a first and a second track (35, 36), respectively, said first and second tracks (35, 36) being parallel, and in that said single loading apparatus (1) is arranged displaceable in a direction at right angles to the first and second tracks (35, 36).

11. A plant according to claim 10, characterized in that said single loading apparatus (1) is arranged to further serve a third and a fourth application unit (37, 38) arranged running on a third and a fourth track (39, 40), respectively, the third track (39) being arranged in extension of the second track (36), and the fourth track (40) being arranged in extension of the first track (35), and in that said single loading apparatus (1) is arranged rotatably about a vertical axis.

12. A method of loading rolls of fibre based sheet material to an application unit (3) for the production of fibre-reinforced parts, for blades for wind power plants, whereby a first roll (2a) already present on the application unit (3) is removed from the application unit and lowered vertically, and a second roll (2b) is lifted vertically and supplied to the application unit, characterized by that the method comprises the following steps in succession:

the second roll (2b) is gripped by means of second grippers (19) arranged on a swivel mechanism (6) arranged rotatably about a swivel axis, the second roll (2b) is lifted by displacing the swivel mechanism (6) in a vertical direction using a lift (5), the first roll (2a) already present on the application unit (3) is gripped by means of first grippers (18) arranged on the swivel mechanism (6), the swivel mechanism (6) is swung about a swivel axis (7) so that the first roll (2a) is replaced by the second roll (2b), the first roll (2a) is lowered by displacing the swivel mechanism (6) is the vertical direction using the lift (5), wherein the swivel mechanism (6) is displaced in horizontal direction in order for the first grippers (18) to reach the first roll (2a) already present on the application unit (3).

13. A method according to claim 12, characterized by that the swivel mechanism (6) is rotated back and forth and is displaced in horizontal direction back and forth in order for the second grippers (19) to place the second roll (2b) on the application unit (3).

14. A method according to claim 12, characterized by that, arranged on the grippers (18, 19), closure mechanisms (8) of radially opening bearings (20, 21) for the shaft ends (9, 10) of the rolls (2a, 2b) are adapted to automatically close and open the radial opening of the bearings (20, 21) during horizontal displacement of the swivel mechanism (6).

15. A method according to claim 12, characterized by that radially opening bearings (20, 21) for the shaft ends (9, 10) of the rolls (2a, 2b) provided on the first and second grippers (18, 19), respectively, are upward open when removing a roll from the application unit (3) or supplying a roll to the application unit.

16. A method according to claim 12, characterized by that a single loading apparatus (1) comprising the swivel mechanism (6) is loading rolls (2) to several application units (32, 33, 37, 38) in succession, whereby the loading apparatus (1) is displaced between the different application units and possibly rotated about a vertical axis.

* * * * *